United States Patent [19]
Unno et al.

[11] Patent Number: 6,134,640
[45] Date of Patent: *Oct. 17, 2000

[54] METHOD FOR TRANSFORMING FLASH MEMORY STORAGE FORMAT BASED ON AVERAGE DATA LENGTH

[75] Inventors: Yusaku Unno; Yuji Niimura, both of Tokyo, Japan

[73] Assignee: Oki Electric Industry Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/069,208

[22] Filed: Apr. 29, 1998

[30] Foreign Application Priority Data

Aug. 22, 1997 [JP] Japan ................... 9-242036

[51] Int. Cl.⁷ ...................................... G06F 12/04
[52] U.S. Cl. ...................... 711/171; 711/103; 711/173
[58] Field of Search ..................... 711/103, 115, 711/170, 171, 173

[56] References Cited

U.S. PATENT DOCUMENTS

| | | | |
|---|---|---|---|
| 5,504,875 | 4/1996 | Mills et al. | 711/171 |
| 5,627,995 | 5/1997 | Miller et al. | 711/171 |
| 5,737,767 | 4/1998 | Agrawal et al. | 711/171 |
| 5,761,478 | 6/1998 | Chen et al. | 711/172 |
| 5,802,598 | 9/1998 | Watt | 711/170 |
| 5,822,781 | 10/1998 | Wells et al. | 711/171 |
| 5,838,614 | 11/1998 | Estakhri et al. | 365/185.11 |
| 5,893,927 | 4/1999 | Hovis | 711/171 |
| 5,933,845 | 8/1999 | Kopp et al. | 711/103 |

FOREIGN PATENT DOCUMENTS

| | | |
|---|---|---|
| 06314171 | 11/1994 | Japan . |
| 07182111 | 7/1995 | Japan . |

OTHER PUBLICATIONS

Technical Bulletin Published by Janan Institute of Invention and Inovation, No. 97—1606, Published on Mar. 3, 1997, Yuji Niimura.

*Primary Examiner*—Eddie P. Chan
*Assistant Examiner*—Kevin Verbrugge
*Attorney, Agent, or Firm*—Rabin & Champagne, P.C.

[57] ABSTRACT

A method for transforming a logic format includes dividing a data segment into a main data segment having a main segment length and a sub data segment having a sub segment length shorter than the main segment length, allotting the main data segment and the sub data segment respectively to a main address and a sub address of a data storage unit, and defining a combination of a data format of a main data area defined by the main segment length and the number of main addresses and of a data format of a sub data area defined by the sub segment length and the number of sub addresses, as a logic format of the data storage unit. A determination is made at an arbitrary time whether the average of the length of all the data stored in the data storage unit is less than a threshold value. The sub segment length is shortened in response to a determination that the average length of all the data stored in the data storage unit is less than a threshold value. A portion of the sub data area thereby freed-up is allotted to the main data area so as to increase the number of the main addresses.

12 Claims, 7 Drawing Sheets

METHOD FOR TRANSFORMING FLASH MEMORY STORAGE FORMAT BASED ON AVERAGE DATA LENGTH

FIELD OF THE INVENTION

This invention relates to an improvement applicable to methods for transforming a logic format and data storage media employable therefor. More specifically, this invention relates to an improvement developed for enabling storage of data having variable length without remaining unemployed memory capacity in a data storage unit, such an improvement being realized by designing a variable data storage format.

BACKGROUND OF THE INVENTION

A semiconductor disk device composed of semiconductor memories e.g. flash memories are designed to allow a system belonging to a higher rank to employ a control system employable for a magnetic disk device et al. The semiconductor disk device having a memory storage unit composed of semiconductor memories available in the prior art usually employs a logic format of a fixed structure.

Referring to drawings, a brief description will be presented below for a semiconductor disk device available in the prior art and drawbacks therewith.

Referring to FIG. 1, a data storage medium (100) composed of a data storage unit (101) further composed of a plurality of e.g. flash memories, and a micro controller (102) is connected to an external device (200), e.g., a computer, to allow a piece of information to be exchanged therebetween. The external device (200) has data (201) therein. The data storage unit (101) has a data storage structure or a logic format (103) divided into a plurality of sectors, (101-1) through (101-n), the sectors being defined by a sector size (101a) and the number of sectors (101b). Since the sector size (101a) is represented by a fixed number, the logic format is of a fixed structure as well.

Referring to FIG. 2A, a brief description will be presented below for problems involved with a process to store data having a variable length or compressed data in a fixed logic format. When data is compressed, the size of each piece of compressed data does not necessarily turn out to be the same, despite the size of each corresponding piece of data being identical. This is caused by differences between the content of each piece of the original data. As a result, the memory capacity can not be fully utilized as long as the fixed logic format is employed.

Referring to FIG. 2B, a brief description will be presented below for problems involving compressed data which are larger after being compressed. If the size of compressed data is nearly the same as the uncompressed data, when a compression process is applied to data which were produced by editing data produced by elongation of compressed data, there is a possibility in which the size of the finally produced data is larger than the size of the original compressed data. As a result, the final compressed data may not fit in its former address.

OBJECTS AND SUMMARY OF THE INVENTION

Accordingly, the object of this invention is to provide methods for transforming a logic format wherein storage of data is possible for data having variable length in a manner to fully utilize the entire capacity of a memory, and data storage media employable for conducting the foregoing improved methods.

To achieve the first one of the foregoing objects, a method for transforming a logic format in accordance with a first example of this invention comprises:

a step for dividing a datum (hereinafter also "data segment") into a main datum having a main datum (main data segment) length and a sub datum (sub data segment) having a sub datum length shorter than the main datum length, a step for allotting the main datum and the sub datum respectively to a main datum address and a sub datum address of a data storage unit, a step for defining a combination of a data format of a main data area defined by the main datum length and the number of main datum addresses and of a data format of a sub data area defined by the sub datum length and the number of sub datum addresses, as a logic format of the data storage unit, a step for determining whether the average length of all the data segments stored in the data storage unit is less than a threshold value, the determining step being conducted at an arbitrary time, a step for shortening the sub datum length in response to a determination that the average length of all the data segments stored in the data storage unit is less than the threshold value, and a step for allotting the portion of the sub data area freed therefrom due to the sub data length shortening, to the main data area so as to increase the number of the main datum addresses.

The concept of the method for transforming a logic format in accordance with the first example of this invention will be described below.

An arbitrary datum segment is divided into a main datum segment (datum) having a main datum length and a sub datum having a sub datum length which is shorter than the main datum length. The main datum and the sub datum are allotted respectively to a main datum address and a sub datum address of a data storage unit. In this step, the main datum length and the sub datum length can be set in an arbitrary length. Logic formats defined by the main datum length and the number of the addresses of the main datum and by the sub datum length and the number of the addresses of the sub datum are converted into the most appropriate logic formats at an arbitrary time. A step is conducted to determine whether the average length of all the data segments stored in the data storage unit is less than a threshold value previously set. By this step, it is determined whether the most appropriate logic format is available or not. If the most appropriate logic format is available, it means that the sub data area contains futile area. In other words, even if the main data area becomes full, the sub data area still has vacant capacity, resultantly showing that the sub data area is not fully employed. Therefore, if the present logic format is converted to the most appropriate logic format which is most appropriate for the data presently stored, all the datum segment sizes can be effectively dealt with to enhance the versatility. Since the number of the main datum addresses is increased, the capacity of the data storage unit appears to have increased with respect to the external device.

To achieve the first one of the foregoing objects, a method for transforming a logic format in accordance with a second example of this invention comprising:

a step for dividing a datum (data segment) into a main datum having a main datum length and a sub datum having a sub datum length shorter than the main datum length, a step for allotting the main datum and the sub datum respectively to a main datum address and a sub datum address of a data storage unit, a step for defining a combination of a data format of a main data area defined by the main datum length and the number of main datum addresses and of a data format of a sub data area defined by the sub datum length and the number of sub datum addresses, as a logic format of the data storage unit, a step for determining whether the average length of all the data segments stored in the data storage unit is larger than a threshold value, the determining step being conducted at an arbitrary time, a step for shortening the sub datum length, in response to a determination that the average length of all the data segments stored in the data storage unit is larger than the threshold value, and a step for allotting the decrement in the sub data area to the main data area so as to elongate the main datum length.

The concept of the method for transforming a logic format in accordance with the second example of this invention will be described below.

In this example, an inspection is conducted to determine whether the most appropriate logic format is available or not by determining whether the average length of all the data segments stored in the data storage unit is larger than a threshold value. In the case where the average length of all the data segments stored in the data storage unit is larger than a threshold value, it means that the main data area contains futile area. In other words, the sub data area becomes full before the main data area becomes full. Therefore, if the present logic format is converted to the most appropriate logic format which is most appropriate for the data presently stored, all the datum sizes can be effectively dealt with to enhance the versatility. Since the number of the sub data segments to be linked is decreased, the access speed from outside can be improved.

The foregoing method for transforming a logic format in accordance with the first example of this invention can be modified to further comprise a step for determining whether the average length of all the data segments stored in the data storage unit is larger than a threshold value, a step for shortening the sub datum length, in response to a determination that the average length of all the data segments stored in the data storage unit is larger than the threshold value, and a step for allotting the thereby freed portion of the sub data area to the main data area so as to elongate the main datum length.

The foregoing modification is a combination of the first and second examples. Since the average length of all the data segments stored in the data storage unit is compared with a threshold value, and since either case will be followed by a process to convert the logic format to the most appropriate logic format, the efficiency and the versatility are further enhanced.

To achieve the second one of the forgoing objects, a data storage medium in accordance with a third example of this invention comprising:

a data storage unit further comprising:
a logic format consisting of:
a data format of a main data area defined by a main data segment length (main datum length) and the number of the main addresses (main datum addresses), a data format of a sub data area defined by a sub datum length (sub segment length) shorter than the main segment length (main datum length) and the number of the sub addresses (sub datum addresses), and a control unit having a function to divide a datum segment (datum) into the main data segment (main datum) and the sub data segment (sub datum), to allot the main datum and the sub datum respectively to a main datum address and a sub datum address of the data storage unit, to determine whether the average of the length of all the data stored in the data storage unit is less than a threshold value at an arbitrary time, to shorten the sub datum length in response to a determination that the average of the length of all the data stored in the data storage unit is less than a threshold value, and to allot the decrement in the sub data area to the main data area so as to increase the number of the main datum addresses, for the ultimate purpose to revise the logic format.

The data storage medium in accordance with the third example of this invention has a data storage unit having a logic format consisting of a data format having the main data area defined by the main datum length and the number of the main datum addresses and the other data format having the sub data length and the number of the sub datum addresses, and a control unit having a function to inspect whether the foregoing logic format has a futile space therein with respect to the length of a datum stored in the data storage unit. As a result, all the datum sizes can be effectively dealt with to enhance the versatility. Since the number of the main datum addresses is increased, the capacity of the data storage unit appears to have increased with respect to the external device.

To achieve the second one of the foregoing objects, a data storage medium in accordance with a fourth example of this invention comprising:

a data storage unit further comprising:
a logic format consisting of:
a data format of a main data area defined by a main datum length and the numbers of the main datum addresses, a data format of a sub data area defined by a sub datum length shorter than the main datum length and the number of the sub datum addresses, and a control unit having a function to divide a datum into the main datum and the sub datum, to allot the main datum and the sub datum respectively to a main datum address and a sub datum address of the data storage unit, to determine whether the average length of all the data (data segments) stored in the data storage unit is larger than a threshold value at an arbitrary time, to shorten the sub datum length with respect to the data storage unit, in response to a determination that the average length of all the data stored in the data storage unit is larger than the threshold value, and to allot the decrement (freed portion) of the sub data area to the main data area so as to increase the main datum length for the ultimate purpose to revise the logic format.

The data storage medium in accordance with the fourth example of this invention has a data storage unit having a logic format consisting of a data format having the main data area defined by the main datum length and the number of the main datum addresses and the other data format having the sub data length and the number of the sub datum addresses, and a control unit having a function to inspect whether the foregoing logic format has a futile space therein with respect to the length of a datum stored in the data storage unit. The inspection is conducted by determining whether the average length of all the data stored in the data storage unit is larger than a threshold value. As a result, all the datum sizes can be effectively dealt with to enhance the versatility. Since the number of the sub data is decreased, the access speed from the external device to a datum is accelerated.

The control unit of the foregoing data storage medium in accordance with the fourth example of this invention can be modified to have a function to determine whether the average length of all the data stored in the data storage unit is less than a threshold value, to shorten the sub datum length with respect to the data storage unit, in response to a determination that the average length of all the data stored in the data storage unit is larger than the threshold value, and to allot the decrement in the sub data area to the main data area so as to increase the main datum length for the ultimate purpose to revise the logic format.

This modification is a combination of the third and fourth examples. The control unit is designed to conduct an inspection process to compare the average length of all the data stored in the data storage unit and to convert the logic format to the most appropriate one in either case where the average length of all the data stored in the data storage unit is larger than or less than the threshold value. This concept is effective to enhance the efficiency and versatility of the system to the variety in size of the data.

The control unit of the foregoing data storage medium in accordance with the third and fourth examples and the forgoing modification of the fourth example can be modified to have a function to revise the logic format, in response to a command to revise the logic format, the command being issued by an external device.

In this concept, a command for converting the logic format to the most appropriate one is issued from the external device.

The control unit of the foregoing data storage medium in accordance with the third and fourth examples and the forgoing modification of the fourth example can be modified to have a function to revise the logic format based on its own decision.

In this concept, a process for converting the logic format to the most appropriate one is conducted based on its own decision, such a decision being made in various cases. As a result, a more efficient employment becomes possible for the capacity of the data storage unit.

BRIEF DESCRIPTION OF THE DRAWINGS

This invention, together with its various features and advantages, can be readily understood from the following more detailed description presented in conjunction with the following drawings, in which.

DETAILED DESCRIPTION OF THE PREFERRED PREFERRED EMBODIMENTS

First of all, a brief description will be presented for a semiconductor disk device employable for methods for transforming a logic format in accordance with this invention.

Figure 1:
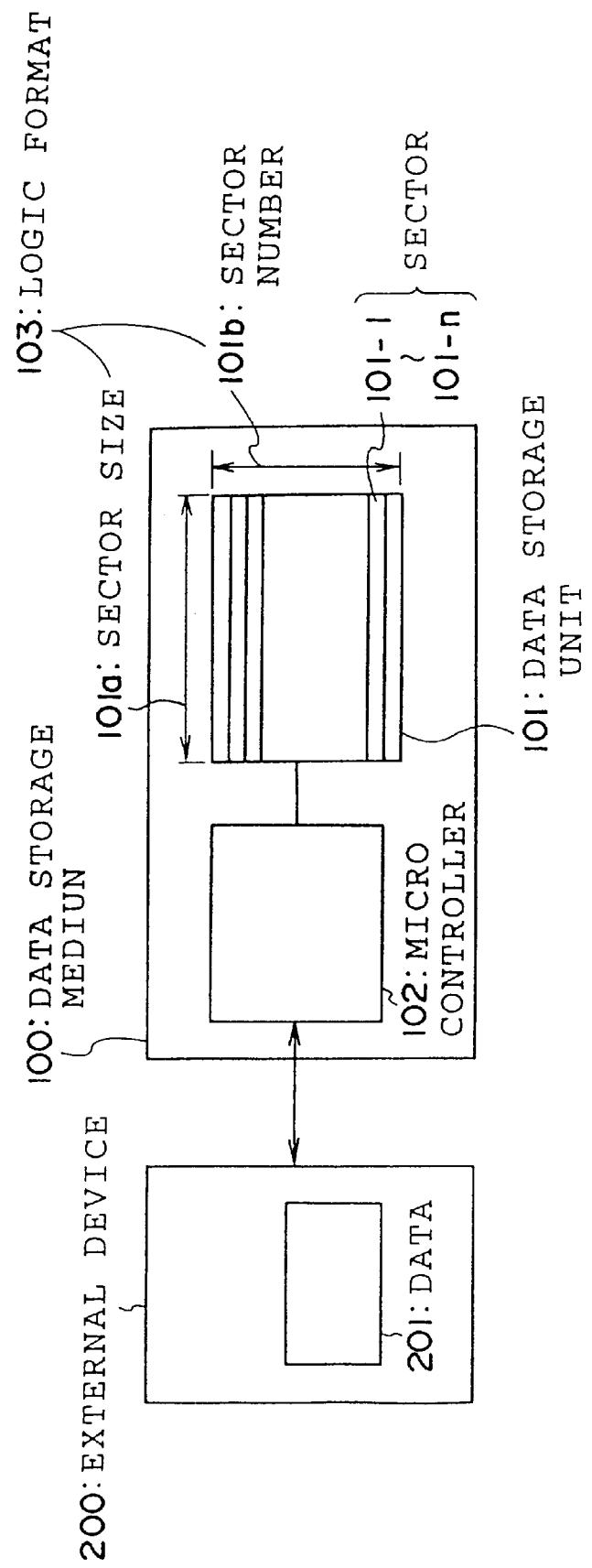
FIG. 1 is a block diagram of a semiconductor disk device available in the prior art.
Figure 2A:
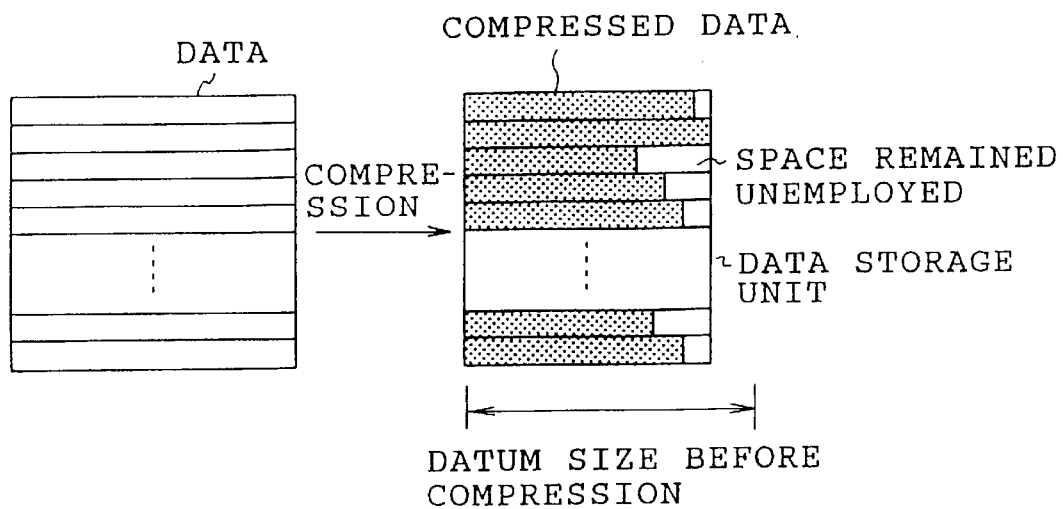
FIG. 2(A) is a chart showing a compression process applied to data, the compression process being available in the prior art.
Figure 2B:
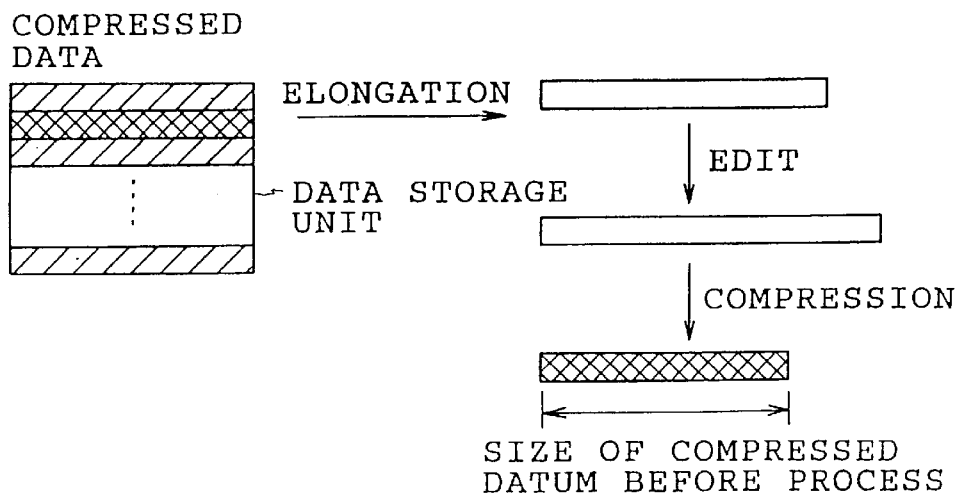
FIG. 2(B) is a chart showing a compression process applied to edited data which were made by elongating compressed data, the compression process being available in the prior art.
Figure 3:
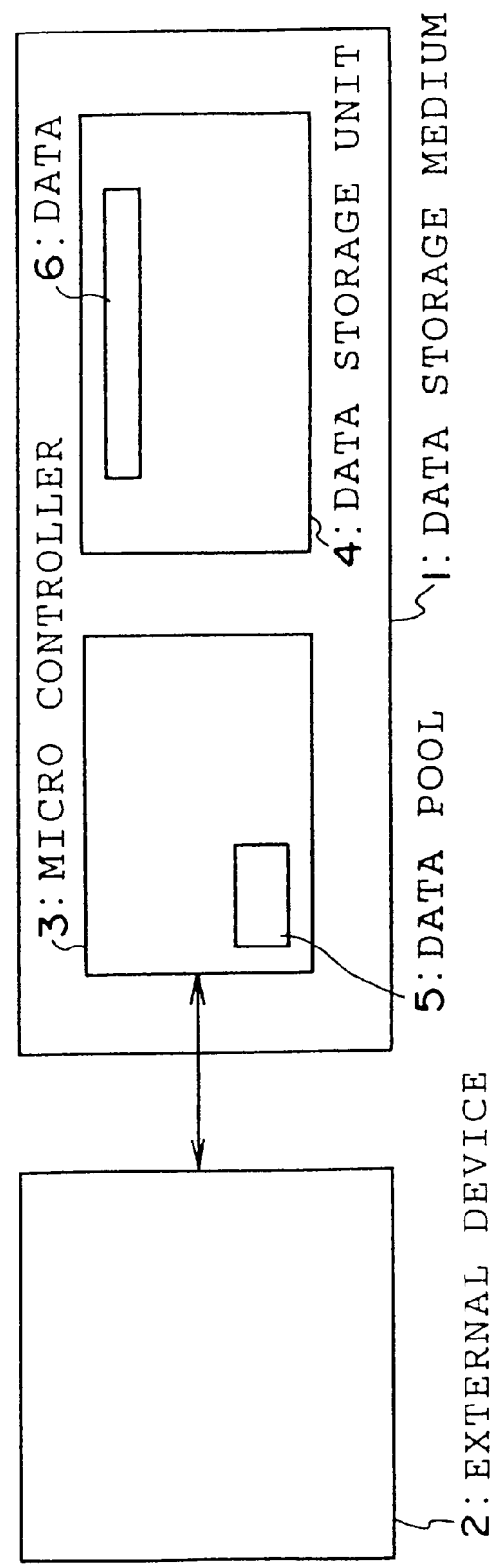
FIG. 3 is a block diagram of a semiconductor disk device employable for a method for transforming a logic format in accordance with this invention.

Referring to FIG. 3, a semiconductor disk device (1) is composed of a micro controller (3) and a data storage unit (4). The micro controller (3) has a function to coordinate the entire control of the semiconductor disk device (1), and has a data pool (5). The data storage unit (4) is composed of a plurality of flash memories. The numeral (6) indicates a data segment stored therein.

Figure 4:
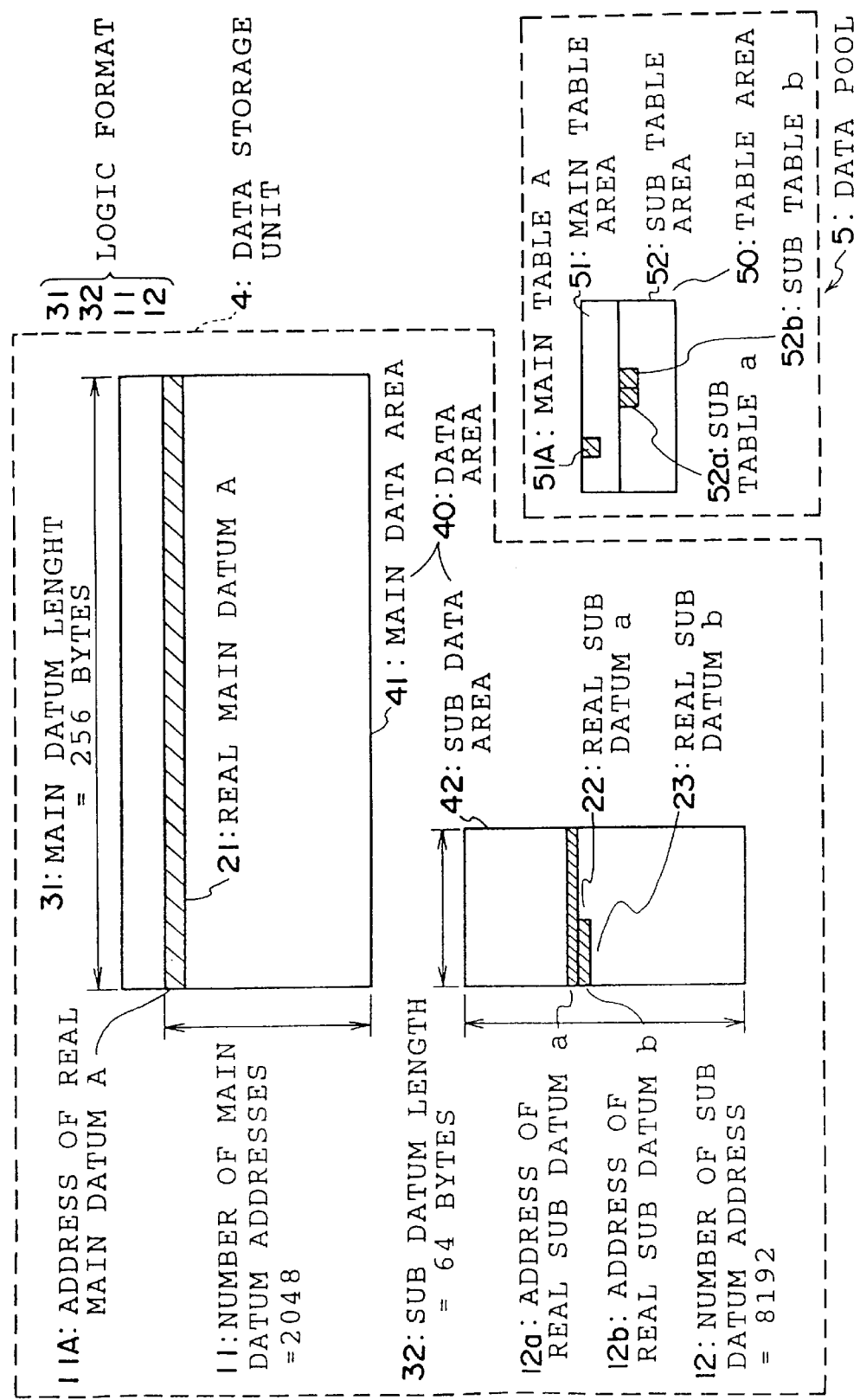
FIG. 4 is a schematic drawing illustrating the logic format of a data storage unit of a semiconductor disk device employable for a method for transforming a logic format in accordance with this invention.

Referring to FIG. 4, the data storage unit (4) has a data area (4) including a main data area (41) and a sub data area (42). The data pool (5) assembled in the micro controller (3) has a table area (50) includingna main table area (51) and a sub table area (52). The main data area (41) of the data storage unit (4) and the main table area (51) of the data pool (5) are linked to each other. In a similar manner, the sub data area (42) of the data storage unit (4) and the sub table area (52) of the data pool (5) are linked to each other. The main data area (41) is employed to store a plurality of real main data (21), and the sub data area (42) is employed to store a plurality of the real sub data (22) and (23).

The address of the real main data segment (real main datum) (11) is an address located in the main data area (41), in which address the real main data segment (real main datum) A (21) is stored. A sub address data address (12) is an address located in the sub data area (42), in which address the real sub data are stored.

The main table A (51A) is employed to enter an address (12a) in which the real sub data segment (real sub datum) a (22), which is located in a position next to the position in which the real main datum A (21) is stored. The sub table a (52a) is employed to enter an address (12b) in which the real sub datum b (23), which is a datum which is arranged next to the real sub datum a (22) is stored.

Figure 5:
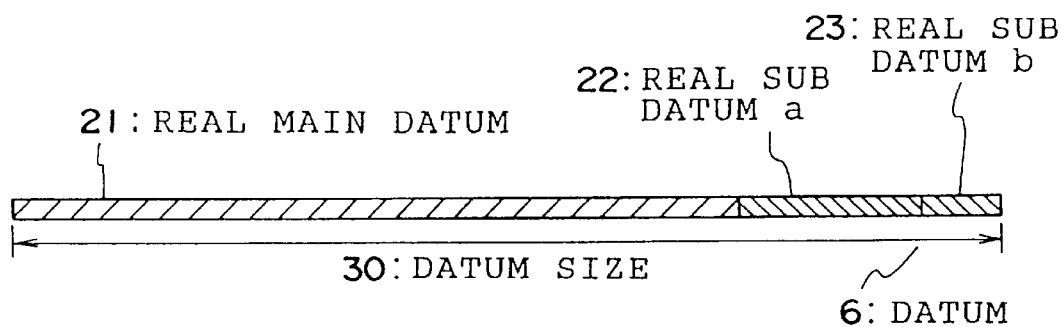
FIG. 5 is a schematic drawing illustrating the structure of a datum (data segments)

Referring to FIGS. 4 and 5, when a data segment (datum) (6) is stored in the data storage medium (1), the micro controller (3) divides the datum (6) into a real main datum A (21) having a length of a main data segment length (main datum length) (31) and a real sub datum a (22) and a real sub datum b (23) having the total length of a sub data segment length (sub datum length) (32). The length of the real main datum A (21) and the length of the real sub datum a (22) and the length of the real sub datum b (23) are summed up to a data segment size (datum size) (30).

The real main datum A (21) is stored in the address of real main datum A (11A) of the main data area (41). The address of the real sub datum a (12*a*) located in the sub data area (42) in which the real sub datum a (22) is stored, is stored in the main table A (51A), and the real sub datum a (22) which is arranged in a position next to the real main datum A (21) is stored in the address of the real sub datum a (12*a*).

Incidentally, the address of the real sub datum b (12*b*) located in the sub data area (42) in which the real sub datum b (23) is stored, is stored in the sub table a (52*a*), and the real sub datum b (23) which is arranged in a position next to the real sub datum a (22) is stored in the address of the real sub datum b (12*b*). Since no real sub datum is arranged next to the real sub datum b (23), a flag indicating that no real sub datum is arranged next to the real sub datum b (23), is set in the sub table b (52*b*).

Referring to FIGS. 3 and 4, when the datum b is read out of the data storage unit (4), the micro controller (3) reads the real main datum A (21) out of the real main datum address (11A) located in the main data area (41). In the next step, the micro controller (3) refers to the main table A (51A) and the address of the real sub datum a (12*a*) in which the real sub datum a (22) which is arranged in a position next to the real main datum A (21) is stored, when it reads the real sub datum a (22) out of the sub data area (42). In the next step, the micro controller (3) refers to the sub table a (52*a*) and the address of the real sub datum b (12*b*) in which the real sub datum b (23) which is arranged in a position next to the real sub datum a (22) is stored, when it reads real sub datum b (23) out of the sub data area (42). In the foregoing manner, the process for reading data out of the data storage unit (4) is conducted. By employment of a step to convert the real datum A (21) and the real sub datum a (22) and the real sub datum b (23), the datum (6) was successfully read out of the data storage unit (4).

First Embodiment

Referring to FIGS. 3, 4, 5 and 6, a control process will be described below for a process to restore a datum (6) stored in the data storage unit (4) in the most appropriate logic format at an arbitrary time. When receiving a command from the external device (2), the micro controller (3) inspects the datum size (30) of all the data stored in the data storage unit (4), and conducts a process to check whether or not a logic format (Hereinafter referred to us the most appropriate logic format.) which can store the datum (6) without futility is available, with respect to the main datum length (31), the main datum address (11), the sub datum length (32) and the sub datum address (12).

For the purpose to check whether or not the most appropriate logic format is available, a comparison process is conducted to compare the average of the data size (30) of the data and a threshold value which is set specifically for this purpose, and the most appropriate logic format is determined to be available, if the average of the data size (30) of the data is less than the threshold value. For example, a sum of the main datum length and the sub datum length is set as the threshold value. In the example shown in FIG. 4, the threshold value is selected to be 320 bytes, after the main datum length (256 bytes) and the sub datum length (64 bytes) are added to 320 bytes.

When a sub data area (42) has unused space, the average of the present data size (30) turns out to be less than the threshold value. In this case, therefore, the sub data area (42) has a vacant space in the capacity, even if the main data area (41) is full. As long as the logic format shown in FIG. 4 is employed, the sub data area (42) can not entirely be employed.

In such a case, the sub datum length (32) of the present logic format is shortened, and the memory area spared thereby is allotted to the main data area (41). In this event, the main datum address (11) is inflated to make the most appropriate logic format.

Referring to FIGS. 3, 4, 5 and 6, a process for making a logic format most appropriate will be described below. Upon a command for making a logic format most appropriate to the micro controller (3) of the data storage medium (1) by the external device (2), the micro controller (3) inspects the datum size (30) of the data stored in the data storage unit (4) and determines if data is stored in the most appropriate logic format. In other words, a process is conducted to check if the average of the data size (30) is less than the average value. If a more appropriate logic format is available, the process for making a logic format most appropriate, is conducted. If a more appropriate logic format is not available, the process for making a logic format most appropriate, is not conducted.

Figure 6:
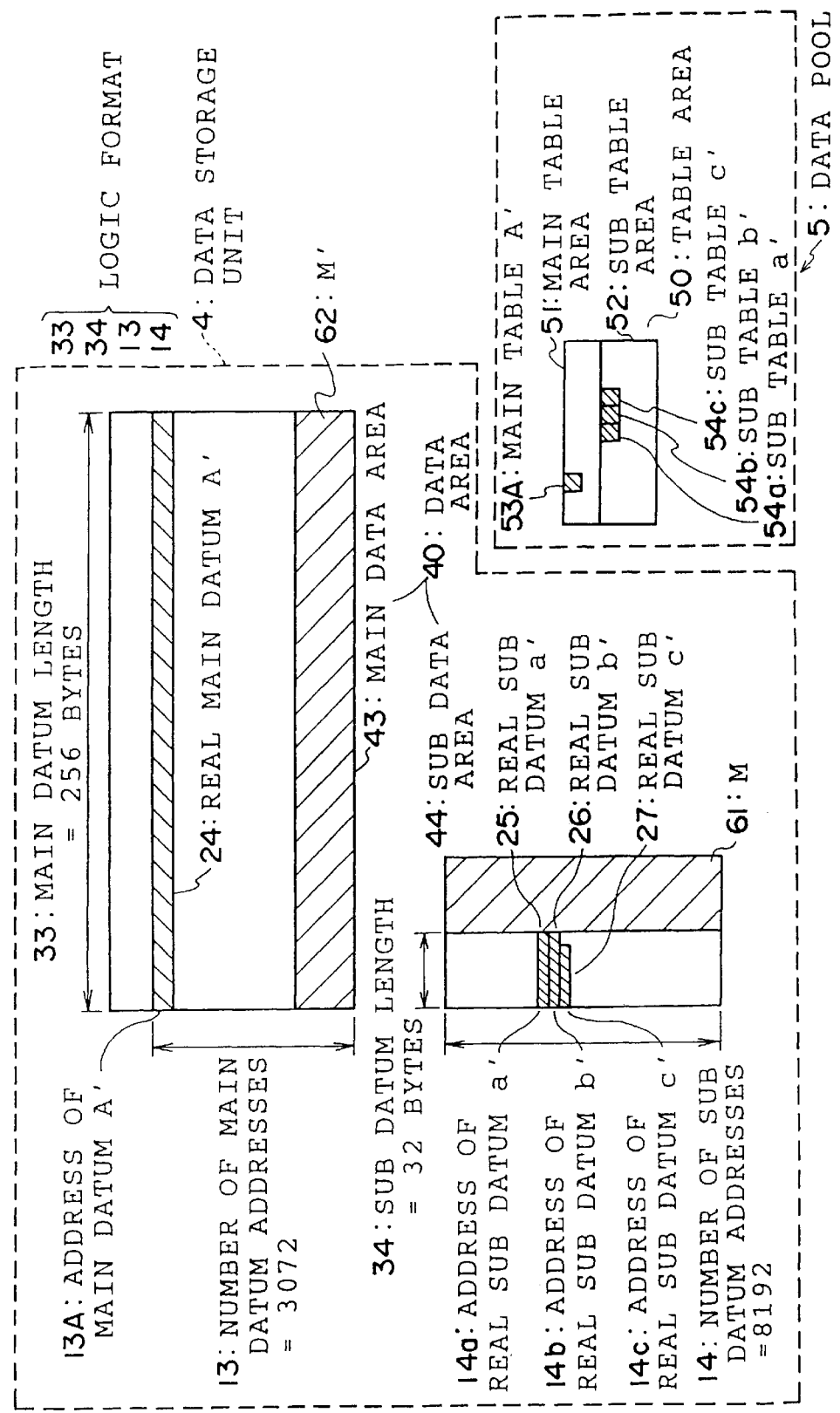
FIG. 6 is a schematic drawing illustrating the logic format which is transformed following a method for transforming a logic format in accordance with a first embodiment of this invention.

Supposing the parameters of the present logic format, including the main datum length (31), the number of the main datum addresses (11), the sub datum length (32) and the number of the sub datum addresses (12) are respectively 256 bytes, 2048, 64 bytes and 8192, as shown in FIG. 4, and supposing the parameters of the most appropriate logic format including the main datum length (33), the main datum address (13), the sub datum length (34) and the sub datum address (14) are respectively 256 bytes, 3072, 32 bytes and 8192, as shown in FIG. 6, the capacity that has become unemployed (a hatched area, M (61)) which can be calculated by the sub datum length (32 bytes) multiplied by the number of the sub datum addresses (8192) is allotted to the main data area (43), and a new hatched area M' (62) is produced and the number of the main datum addresses (13) is revised from 2048 to 3072. Since the number of the main datum addresses (13) is increased, the capacity of the data storage medium (1) appears to have increased with respect to the external device (2).

The micro controller (3) restores the data (6) in the data storage unit (4) employing the foregoing most appropriate logic format, in a series of processes similar to that which was described referring to FIG. 4.

Referring to FIG. 6, when a datum (6) is restored in the data storage medium (1), the micro controller (3) divides the datum (6) to the main datum length (33) and a plurality of the sub datum length (34). As a result, the real main datum A (21), the real sub datum a (22) and the real sub datum b (28) illustrated in FIG. 4 are converted respectively to the real main datum A' (24), the real sub datum a' (25), the real sub datum b' (26) and the real sub datum c' (27) illustrated in FIG. 6.

The real main datum A' (24) is stored in the address of the real main datum A' (13A) of the main data area (43). The address of the real sub datum a' (14*a*) located in the sub data area (44) in which the real sub datum a' (25), which is arranged in a position next to the real main datum A' (24), is stored in the main table A' (53A), which is linked the real main datum A' (24), and the real sub datum a' (25) is stored in the address of the real sub datum a' (14*a*). In the next step, the address of the real sub datum b' (14*b*) located in the sub data area (44) in which the real sub datum b' (26), which is arranged in a position next to the real sub datum a' (25), is stored in the sub table a' (54*a*) that is linked the real sub datum a' (25), and the real sub datum b' (26) is stored in the address of the real sub datum b' (14*b*). In the next step, the address of the real sub datum c' (14*c*) located in the sub data area (44) in which the real sub datum c' (27), which is arranged in a position next to the real sub datum b' (26), is stored in the sub table b' (54*b*) that is linked the real sub datum b' (26), and the real sub datum c' (27) is stored in the address of the real sub datum c' (14c). In this manner, the datum (6) is stored.

As was described above, all the datum sizes can be dealt with in an efficient and versatile manner. Incidentally, since the number of the main datum addresses is increased, the capacity of the data storage unit (1) appears to have been increased with respect to the external device.

Second Embodiment

Referring to FIGS. 3, 4, 5 and 7, when receiving a command from the external device (2), the micro controller (3) of the data storage medium (1) inspects the datum size (30) of all the data stored in the data storage unit (4), and conducts a process to check whether or not a more appropriate logic format is available. In this embodiment, the most appropriate logic format is produced by shortening the length of a sub datum, without revising the address of a main datum, when the average of the data size (30) is larger than a threshold value.

Similarly to the first embodiment, a sum of the main datum length and the sub datum length is set as the threshold value. In the example shown in FIG. 4, the threshold value is selected to be 320 bytes, after the main datum length (256 bytes) and the sub datum length (64 bytes) are added to 320 bytes.

When a main data area (41) has unused space, the average of the present data size (30) turns out to be larger than the threshold value. In this case, therefore, the sub data area (42) has lost a vacant space, before the main data area (41) becomes full, resultantly making the main data area (41) difficult to be fully employed.

In such a case, the sub datum length (32) of the present logic format is shortened, and the memory area spared thereby is allotted to the main data area (41). In this event, or in the case where the memory area spared thereby is allotted to the main data area (41), the main datum length is elongated to produce the most appropriate logic format.

Figure 7:
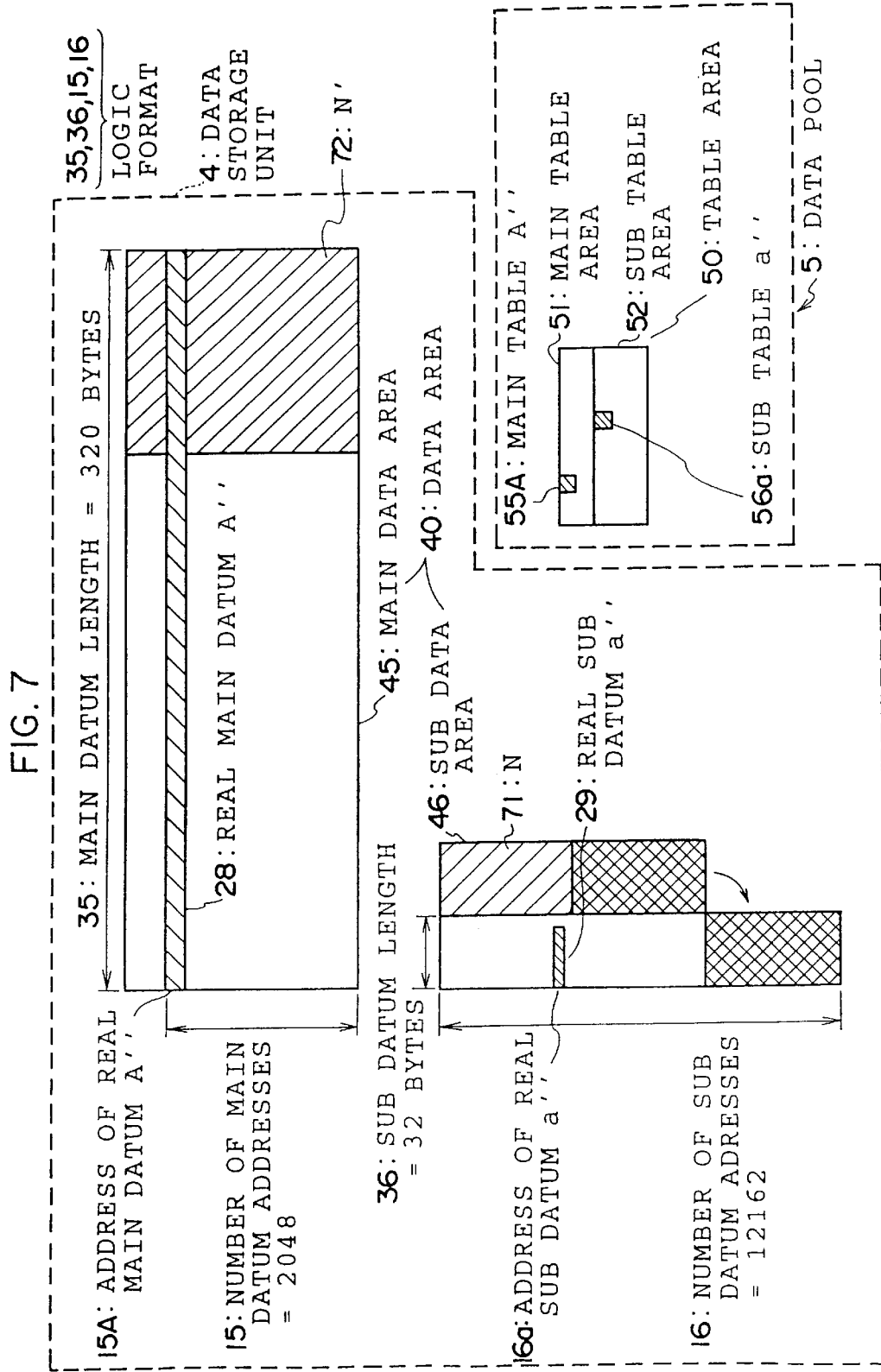
FIG. 7 is a schematic drawing illustrating the logic format which is transformed following a method for transforming a logic format in accordance with a second embodiment of this invention.

Referring to FIGS. 3, 4 and 7, a process for making a logic format most appropriate will be described below. Upon a command for making a logic format most appropriate given to the micro controller (3) of the data storage medium (1) by the external device (2), the micro controller (3) inspects the datum size (30) of the data (6) stored in the data storage unit (4) and determines if the most appropriate logic format is available. If a more appropriate logic format is available, the process for making a logic format most appropriate is conducted. If a more appropriate logic format is not available, the process for making a logic format most appropriate is not conducted.

For example, if the parameters of the present logic format including the main datum length (31), the number of the datum addresses (11), the sub datum length (32) and the number of the sub datum addresses (12) are respectively 256 bytes, 2048, 64 bytes and 8192, as shown in FIG. 4, and if the parameters of the most appropriate logic format including the main datum length (35), the number of the main datum addresses (15), the sub datum length (36) and the number of the sub datum addresses (16) are respectively 320 bytes, 2048, 32 bytes and 12162; then as shown in FIG. 7, the unused capacity of the original sub data area (46) or the capacity of a hatched area N (71) is allotted to the main data area (45), and a hatched area N' (72) is introduced in the main data area (45), and the number of the main datum addresses (35) is revised from 256 to 320. Since the number of the main datum addresses (15) stays unchanged, the external device (2) does not recognize the foregoing change applied to the data storage medium (1).

The micro controller (3) restores the data (6) in the data storage unit (4) employing the foregoing most appropriate logic format, in a series of processes identical to that which was described referring to FIG. 4.

Referring to FIG. 7, when a datum (6) is restored in the data storage medium (1), the micro controller (3) divides the datum (6) into the main datum length (35) and the sub datum length (36). As a result, the real main datum A (21), the real sub datum a (22) and the real sub datum b (28) illustrated in FIG. 4 are converted respectively to the real main datum A" (28) and the real sub datum a" (29) illustrated in FIG. 7.

The real main datum A" (28) is stored in the address of the real main datum A" (15A) of the main data area (45). The address of the real sub datum a" (16a) is located in the sub data area (46). The real sub datum a" (29) is arranged in a position next to the real main datum A" (28). The real sub datum A" is stored in the main table A" (55A) and linked the real main datum A" (28), and the real sub datum a" (29) is stored in the address of the real sub datum a" (16a). Since the real sub datum a" (29) is not followed by any real sub datum, a flag is set to the sub table a" (56a) to show this position. In this manner, the datum (6) is stored.

As was described above, all the datum size can be dealt with in an efficient and versatile manner. Incidentally, since the number of the sub data to be linked is decreased, the speed of access to the data transferred from the external device (2) is increased.

Although the foregoing embodiments describe conducting a process for making a logic format most appropriate is, following a command issued by the external device (2), the process for making a logic format most appropriate can be conducted independently in the data storage medium (1). For example, the micro controller (3) can initiate the process periodically, e.g., in response to a turn on of the power supply of the data storage medium (1) and in response to an action for inputting a datum. Further, the process may be initiated in response to a condition, e.g., on condition that the number of times in which storage of data is conducted to the data storage medium (1) has exceeded a threshold value or on condition that the average length of data has exceeded a threshold value.

It is understood that the numbers recited are for example only to show the main datum length, the number of the main datum addresses, the sub datum length and the number of the sub datum addresses in the foregoing embodiments, are not meant to be construed in a limiting sense. Further, threshold values for determining whether the most appropriate logic format is available, can be set depending on a specific condition.

Although the foregoing is described herein in terms of flash memories in the data storage unit (4), this invention can be applied to any other cases including a data storage unit for other types of memories, as long as a logic format is employed in a data storage medium.

Therefore, various modifications of the disclosed embodiments, as well as other embodiments of this invention, will be apparent to persons skilled in the art upon reference to the description of this invention. It is therefore intended that the appended claims will cover any such modifications or embodiments as fall within the spirit and scope of this invention.

What is claimed is:

1. A method for transforming data being maintained in a first data storage format to a second data storage format, said method comprising the steps of:

dividing a data segment into a main data segment having a main segment length and a sub data segment having a sub segment length shorter than said main segment length;

assigning said main data segment and said sub data segment, respectively, to a main address in a main data area of a data storage unit and a sub address in a sub data area of the data storage unit;

defining a data storage format of said data storage unit as being a combination of formats of said main data area and said sub data area, the format of said main data area being defined by said main segment length and a number of main addresses and the format of said sub data area being defined by said sub segment length and a number of sub addresses;

determining whether the average of the length of all the data segments stored in said data storage unit is less than a threshold value;

shortening said sub segment length responsive to a determination that the average length of all data segments stored in said data storage unit is less than the threshold value; and assigning area freed from said sub data area to said main data area, the number of said main addresses being increased by said assigned free area.

2. A method for transforming data from a first to a second data storage data storage format in accordance with claim 1, further comprising:

determining whether the average length of all the data segments stored in said data storage unit is larger than a further threshold value, shortening said sub segment length of all the data segments stored in said data storage unit is larger than the further threshold value, and distributing area freed from said sub data area among said main data addresses, said main data segments being lengthened.

3. A method for transforming data being stored in a first data storage format to a second data storage format, said method comprising the steps of:

dividing a data segment into a main data segment having a main segment length and a sub data segment having a sub segment length shorter than said main segment length;

assigning said main data segment and said sub data segment, respectively, to a main address in a main data area of a data storage unit and a sub address in a sub data area of the data storage unit;

defining a data storage format of said data storage unit as being a combination of formats of said main data area and said sub data area, the format of said main data area being defined by said main segment length and a number of main addresses and the format of said sub data area being defined by said sub segment length and a number of sub addresses;

determining whether the average length of all the data data segments stored in said data storage unit is greater than a threshold value;

shortening said sub segment length responsive to a determination that the average length of all data segments stored in said data storage unit is greater than the threshold value; and distributing area freed from said sub data area among said main addresses, said main data segments being lengthened by said distributed free area.

4. A data storage unit including data storage medium for storing data in a variable format, said data storage unit comprising:

a main area having a number of addressable main data segment locations, data segments stored at each of said main data segment locations in said main area having a main segment length;

a sub area having a number of addressable sub data segment locations, data segments stored at each of said sub data segment locations in said sub area having a sub segment length; and a control unit dividing data segments into main data segments and sub data segments, each main data segment being assigned to one of said addressable main data segments locations and each sub data segment being assigned to one of said addressable sub data segment locations, said control unit determining whether the average length of all data segments stored in said data storage unit is less than a threshold value and, responsive to a determination that the average length of all the data segments stored in said data segment unit less than the threshold value, said control unit shortening said sub segment length and assigning area freed from said sub data area to said main data area as additional main addresses, said control unit thereby revising the format of data being stored.

5. A data storage unit as in claim 4, said control unit further dividing data segments into main data segments and sub data segments, each main data segment being assigned to one of said addressable main data segment locations and each sub data segment being assigned to one of said addressable sub data segment locations, said control unit determining whether the average length of all data segments stored in said data storage unit is larger than a further threshold value and responsive to a determination that the average of the length of all the data segments stored in said data storage unit is larger than the further threshold value, said control unit shortening said sub segment length and distributing area freed from said sub data area to said main addresses increasing the main segment length, said control unit thereby revising the format of data being stored.

6. A data storage medium in accordance with claim 5, wherein said control unit further revises said data storage format, in response to a command issued by an external device.

7. A data storage medium in accordance with claim 5, wherein:

said control unit further determines when to revise said data storage format.

8. A data storage medium in accordance with claim 4, wherein said control unit further revises said data storage format in response to a command issued by an external device.

9. A data storage medium in accordance with claim 4, wherein said control unit further determines when to revise said data storage format.

10. A data storage unit including data storage medium for storing data in a variable format, said data storage unit comprising:

a main area having a number of addressable main data segment locations, data segments stored at each of said main data segment locations in said main area having a main segment length;

a sub area having a number of addressable sub data segment locations, data segments stored at each of said sub data segment locations in said sub area having a sub segment length; and a control unit dividing data segments into main data segments and sub data segments, each main data segment being assigned to one of said addressable main data segment locations and each sub data segment being assigned to one of said addressable sub data segment locations, said control unit determining whether the average length of all data segments stored in said data storage unit is larger than a threshold value and, responsive to a determination that the average length of all the data segments stored in said data storage unit is larger than the threshold value, said control unit shortening said sub segment length and distributing area freed from said sub data area to said main addresses increasing the main segment length, said control unit thereby revising the format of data being stored.

11. A data storage medium in accordance with claim 10, wherein said control unit further revises said data storage format in response to a command issued by an external device.

12. A data storage medium in accordance with claim 10, wherein said control unit further determines when to revise said data storage format.

* * * * *